United States Patent
Baughman et al.

(10) Patent No.: US 10,334,201 B2
(45) Date of Patent: *Jun. 25, 2019

(54) AUTONOMIC POSITIONING OF OVERLAYS WITHIN STREAMING DATA

(71) Applicant: INTERNATIONAL BUSINESS MACHINES CORPORATION, Armonk, NY (US)

(72) Inventors: Aaron K. Baughman, Silver Spring, MD (US); Mauro Marzorati, Lutz, FL (US); Ahmed M. Nassar, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,983

(22) Filed: Dec. 19, 2017

(65) Prior Publication Data

US 2018/0205904 A1 Jul. 19, 2018

Related U.S. Application Data

(63) Continuation of application No. 15/405,444, filed on Jan. 13, 2017, now Pat. No. 9,930,285.

(51) Int. Cl.
*H04N 5/45* (2011.01)
*H04N 21/488* (2011.01)
(Continued)

(52) U.S. Cl.
CPC .......... *H04N 5/45* (2013.01); *H04N 5/44504* (2013.01); *H04N 7/0885* (2013.01); *H04N 21/24* (2013.01);
(Continued)

(58) Field of Classification Search
CPC .......... H04N 21/4884; H04N 21/4316; H04N 21/2625; H04N 21/24; H04N 21/25891;
(Continued)

(56) References Cited

U.S. PATENT DOCUMENTS 7,206,029 B2 * 4/2007 Cohen-Solal ............ H04N 5/45
345/629
7,633,554 B2 * 12/2009 Sloo .................. H04N 21/44008
348/564

(Continued)

OTHER PUBLICATIONS

Specification "Autonomic Positioning of Overlays Within Streaming Data" and Drawings in U.S. Appl. No. 15/405,444, filed Jan. 13, 2017, 51 pages.

(Continued)

*Primary Examiner* — Oschta I Montoya
(74) *Attorney, Agent, or Firm* — Christopher McLane; Andrew D. Wright; Roberts Mlotkowski Safran Cole & Calderon, P.C.

(57) ABSTRACT

Systems and methods for autonomic positioning of overlays within streaming data are disclosed. In embodiments, a computer-implemented method comprises: providing a hosted data stream containing a first display object to a plurality of participants through respective participant devices; providing a hosted second display object to the plurality of participants through the respective participant devices, wherein the second display object is contained within an overlay that is positioned atop the first display object at a first position; calculating consensus coordinates for the second display object based on suggested position data received from the respective participant devices; calculating customized coordinates for the second display object for each of the respective participant devices based on (Continued)

the consensus coordinates and participant data; and sending the customized coordinates to each of the respective participant devices.

19 Claims, 9 Drawing Sheets

(51) Int. Cl.
*H04N 21/431* (2011.01)
*H04N 21/262* (2011.01)
*H04N 21/24* (2011.01)
*H04N 21/258* (2011.01)
*H04N 21/25* (2011.01)
*H04N 21/2668* (2011.01)
*H04N 5/445* (2011.01)
*H04N 7/088* (2006.01)

(52) U.S. Cl.
CPC ..... *H04N 21/252* (2013.01); *H04N 21/25891* (2013.01); *H04N 21/2625* (2013.01); *H04N 21/2668* (2013.01); *H04N 21/4316* (2013.01); *H04N 21/4884* (2013.01)

(58) Field of Classification Search
CPC .... H04N 21/252; H04N 21/2668; H04N 5/45; H04N 5/44504; H04N 7/0885
See application file for complete search history.

(56) References Cited

U.S. PATENT DOCUMENTS

| | | | | |
|---|---|---|---|---|
| 8,595,761 | B2* | 11/2013 | Amsterdam | H04N 21/4314 |
| | | | | 715/700 |
| 2002/0140862 | A1 | 10/2002 | Dimitrova et al. | |
| 2002/0196370 | A1* | 12/2002 | Dagtas | H04N 5/44508 |
| | | | | 348/600 |
| 2004/0027487 | A1 | 2/2004 | Rzadzki et al. | |
| 2006/0123340 | A1* | 6/2006 | Bailey | G06F 9/44526 |
| | | | | 715/700 |
| 2009/0249386 | A1* | 10/2009 | Shan | G06Q 30/02 |
| | | | | 725/32 |
| 2009/0282358 | A1* | 11/2009 | Park | G06F 8/38 |
| | | | | 715/781 |
| 2010/0162289 | A1* | 6/2010 | Sanders | H04N 21/4758 |
| | | | | 725/23 |
| 2010/0164989 | A1* | 7/2010 | Margalit | G06F 3/0481 |
| | | | | 345/629 |

OTHER PUBLICATIONS

List of IBM Patents or Patent Applications Treated as Related 1 page.

* cited by examiner

AUTONOMIC POSITIONING OF OVERLAYS WITHIN STREAMING DATA

BACKGROUND

The present invention relates generally to overlaying objects in a video, more particularly, to autonomic positioning of overlays within streaming data.

In an analog world where video pictures are transmitted in analog fashion and carrier waveform, the moving picture is transmitted as a sequential set of "fields" describing a static image to be painted on the screen by a receiver device. The image to be rendered by the receiver is therefore "flat" in the sense that it is a collection of pixels without any meaning. There is no concept of layering nor of objects that might be manipulated by the receiver in some fashion. The generation of secondary objects to be displayed as an overlay of the picture is done at the transmitting end and incorporated into a transmitted picture as an integral part of the transmitted picture. The receiver device in this scenario cannot choose to alter the overlaid object in any fashion whatsoever.

Analog video broadcasting developed the ability to transmit an embedded stream within the broadcasting video picture as a mechanism to transmit textual representations of the spoken words or sounds contained in the broadcast for the benefit of the deaf and hard of hearing. Receivers enabled to decode and display the contents of this embedded stream allow the viewer to toggle on or off the display of the captioned information. The positioning of the overlaid object is not under the control of the viewer or the receiver; rather, the positioning is encoded at the source and is part of the data stream.

Within the realm of analog video broadcasts, the concept of Picture-in-picture (PiP) has also been developed. In order to achieve this functionality, two tuner mechanisms are needed to present the information to specially designed receivers. The output of one tuner is displayed by the receiver in a full screen and the secondary tuner's output is displayed as an overlaid picture on top of the primary picture. In this case, the receiver usually enables the viewer to select positioning of the PIP window within a set of pre-selected positions on the screen.

In the digital world, video pictures are transmitted as a data stream within the frame of a device or program (CODEC) capable of performing transformation of a data stream or signal and interpreting instructions within the data stream to present a displayed object. Some CODECs support the embedding of one secondary data stream within a primary data stream. In this case, the embedding of a secondary data stream contains an object to be displayed within the frame of the primary display, and usually contains positioning information for the object as well.

SUMMARY

In an aspect of the invention, a computer-implemented method for autonomic positioning of overlays within streaming data includes: providing, by a computer device, a hosted data stream containing a first display object to a plurality of participants through respective participant devices; providing, by the computer device, a hosted second display object to the plurality of participants through the respective participant devices, wherein the second display object is contained within an overlay that is positioned atop the first display object at a first position; calculating, by the computing device, consensus coordinates for the second display object based on suggested position data received from the respective participant devices; calculating, by the computing device, customized coordinates for the second display object for each of the respective participant devices based on the consensus coordinates and participant data; and sending, by the computing device, the customized coordinates to each of the respective participant devices.

In another aspect of the invention, there is a computer program product for autonomic positioning of overlays within streaming data. The computer program product comprises a computer readable storage medium having program instructions embodied therewith. The program instructions are executable by a computing device to cause the computing device to: provide a hosted data stream containing a first display object to a plurality of participants through respective participant devices; obtain and process participant data from the respective participant devices to determine correlations and covariance between the participants; provide a hosted second display object to the plurality of participants through the respective participant devices, wherein the second display object is contained within an overlay that is positioned atop the first display object at a first position; receive suggested position data for the second display object from a subset of the respective participant devices; calculate consensus coordinates for the second display object based on the suggested position data; calculate optimal coordinates for the second display object for each of the respective participant devices based on the consensus coordinates and the correlations and covariance between the participants; and send the optimal coordinates to each of the respective participant devices, wherein at least two different optimal coordinates are sent to respective participant devices.

In another aspect of the invention, there is a system for autonomic positioning of overlays within streaming data. The system includes a CPU, a computer readable memory and a computer readable storage medium associated with a computing device. The system further includes: program instructions to provide a hosted data stream containing a first display object to a plurality of participants through respective participant devices; program instructions to provide a hosted second display object to the plurality of participants through the respective participant devices, wherein the second display object is contained within an overlay that is positioned atop the first display object at a first position; program instructions to receive suggested position data for the second display object from a subset of the respective participant devices; program instructions to calculate consensus coordinates for the second display object based on the suggested position data; program instructions to retrieve correlation and covariance data for the participants from a data store; program instructions to calculate optimal coordinates for the second display object for each of the respective participant devices based on the consensus coordinates and the correlations and covariance data; and program instructions to send the optimal coordinates to each of the respective participant devices, wherein the optimal coordinates are customized for each of the participants; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
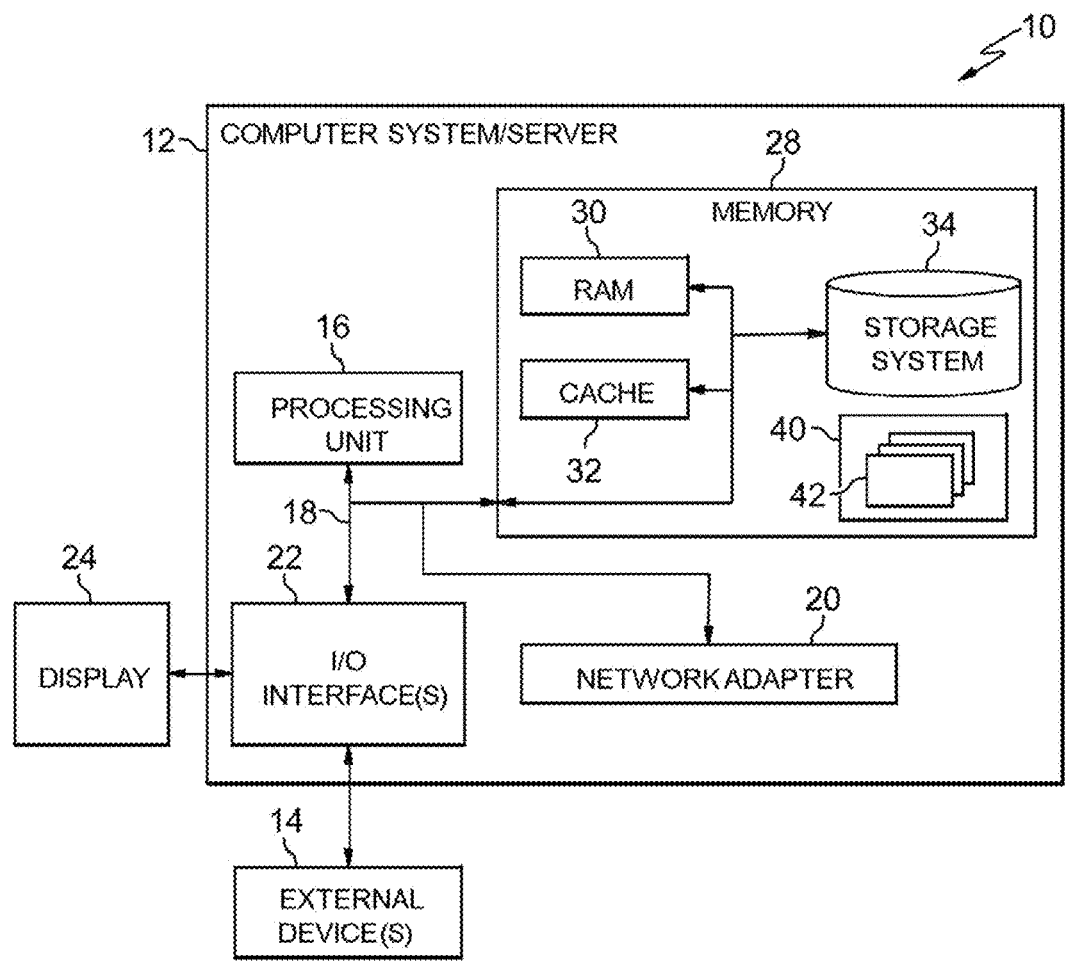
FIG. 1 depicts a computing infrastructure according to an embodiment of the present invention.

The present invention relates generally to overlaying objects in a video, more particularly, to autonomic positioning of overlays within streaming data. In embodiments, a system and method provide a solution for the display of Picture-in-Picture (PiP) windows containing a secondary data stream or video program contained within overlays that can be positioned. Such PiP windows may encompass the display of closed caption overlays, the display of scoreboards in a sporting broadcast, or the display of in-picture advertisement graphics.

A drawback to PiP systems and the general overlaying in a display of a secondary object is that the part of the screen which contains the PiP window or the second object to be displayed is obscured and thus not visible to the viewer. Should that obscured portion of the screen contain important information (e.g., action), the viewer will not see it. This obscured information degrades a viewer's ability to experience the fullness of the primary broadcast or data stream.

In embodiments, a method for enhancing overlay positioning in streaming data is provided, including: hosting a data stream containing a first displayed object; providing one or more second displayed objects, wherein the second displayed objects are contained within overlays that are positioned atop the first displayed object and moved by at least one recipient of the hosted data stream and a cognitive computing element; detecting at least one movement of the at least one second displayed object by the at least one recipient of the hosted data stream and a cognitive computing element; and calculating if the movement meets or exceeds a threshold of positional advantage.

Advantageously, embodiments of the invention provide a technical solution to enable PiP windows in a video broadcast stream to be viewed without obscuring primary views of interest in a main viewing window of a consumer device by utilizing a cognitive computing element to be integrated in the positioning of video overlays in the video broadcast stream. Moreover, embodiments of the invention foster a sense of community among users whose actions, as a whole, may modify the viewing pleasure of others.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
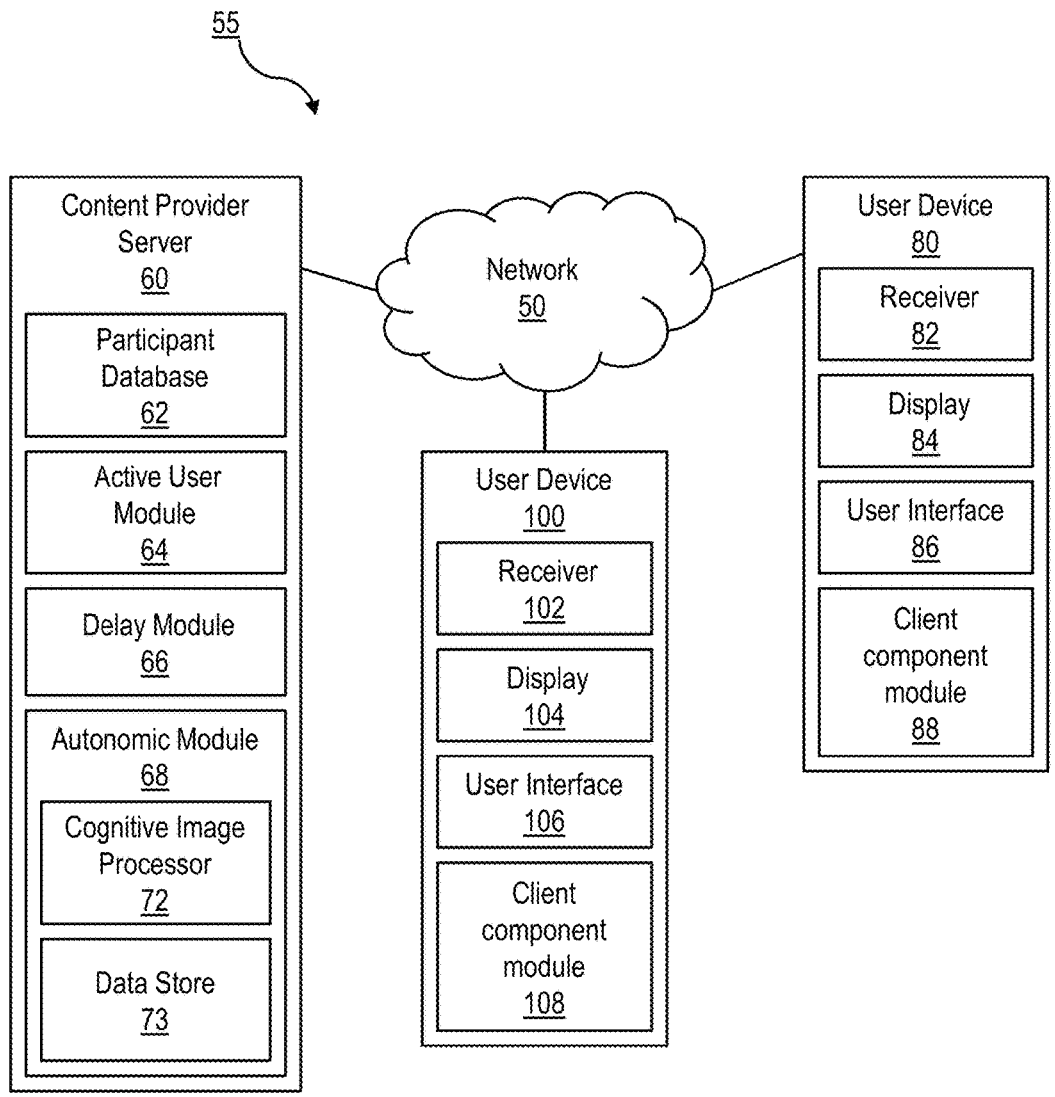
FIG. 2 shows an exemplary environment in accordance with aspects of the invention.

FIG. 2 shows an exemplary Picture-in-Picture (PiP) system 55 in accordance with aspects of the invention. An exemplary PiP system 55 environment includes a content provider server 60 connected to multiple user devices (represented by user devices 80 and 100) through a network 50. The content provider server 60 may comprise a computer system 12 of FIG. 1, and may be connected to the network 50 via the network adapter 20 of FIG. 1. The content provider server 60 may be configured as a special purpose computing device that is part of a broadcast provider infrastructure. For example, the content provider server 60 may be configured to provide streaming video with PiP window overlay technology to multiple user devices (e.g., 80, 100) simultaneously.

The network 50 may be any suitable communication network or combination of networks, such as a local area network (LAN), a general wide area network (WAN), and/or a public network (e.g., the Internet). The user computer devices 80, 100 may be a general purpose computing device, such as a desktop computer, laptop computer, tablet computer, smartphone, etc. The user computer devices 80, 100 may be special purpose computing devices, such as smart televisions, and the like. Each user computer device (e.g., 80, 100) may include a receiver (e.g., 82, 102) for receiving streaming data, a display (e.g., 84, 104) for displaying the streaming data to a participant, and a user interface (e.g., user interface 86, 106) enabling the participant to change the position of a PiP window, enter user preference data, etc. Each user computer device (e.g., 80, 100) may further include a client component module 88, 108 including one or more program modules (e.g., program module 42 of FIG. 1) executed by the respective computer device (e.g., 80, 100) to perform one or more functions described herein. In embodiments, the client component module (e.g., 88, 108) is configured to: receive user input through a user interface (e.g., 86, 106) of the user device (e.g., 80, 100), receive user-specific delay data from the content provider server 60, and cause program streams received from the content provider server 60 to be displayed on the display (e.g., 84, 104) of the user device based in accordance with the user-specific delay data. Further details regarding the function of the client component module (88, 108) are provided below.

Still referring to FIG. 2, the content provider server includes a participant database 62 configured to receive and store participant data, and a plurality of modules configured to perform one or more of the functions described herein. In embodiments, an active user module 64, a delay module 66 and an autonomic module 68 include one or more program modules (e.g., program module 42 of FIG. 1) executed by the content provider server 60. In embodiments, the active user module 64 is configured to receive PiP window repositioning input from multiple user devices (e.g., 80, 100), compute a value of an individual user's contribution to the PiP system 55 (based on the received input), compute an individual user's standing, and update the user's standing in the participant database 62. In embodiments, the delay module 66 is configured to retrieve an individual user's assigned delay (i.e., the amount of delay of a video stream) in the participant database 62, calculate a user's delay, and update the user's assigned delay in the participant database 62. In embodiments, the autonomic module 68 is configured to obtain PiP positioning feedback data from users, process the data to obtain customized and optimal positioning data for one or more PiP windows, and generate optimal PiP window coordinates. In aspects, the autonomic module 68 includes a cognitive image processor 72 for analyzing consensus coordinate data and participant data to determine customized optimal coordinate data and a data store 73 for storing optimal coordinate data. Additional details regarding each of the above-modules are discussed below.

Figure 3:
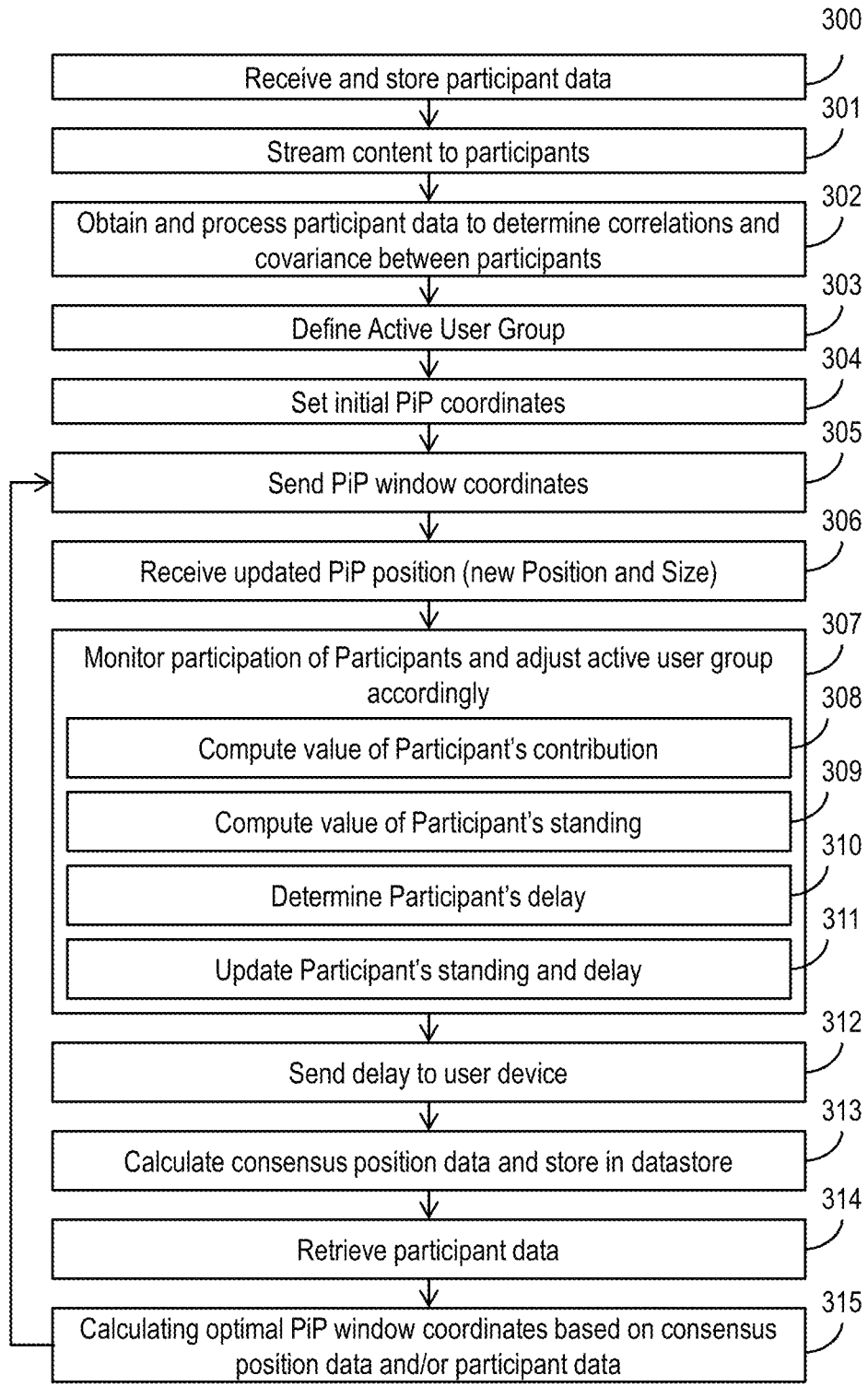
FIG. 3 shows a flowchart of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2. For ease of reference, the steps of FIG. 3 are discussed with reference to the user device 80, although it should be understood that the steps may be performed using other user devices (e.g., 100).

At step 300, participant data is received and stored. In embodiments, participant data is gathered by the content provider server 60 and stored in the participant database 62. In aspects, a participant (e.g., consumer of streaming digital media) may set individual preferences as to the participant's willingness to participate in aspects of the PiP system 55. If the participant chooses to participate, the participant may choose to set individual preferences to govern the liveliness of the PiP movements on the display 84 of their user device 80. For example, a participant may set preferences regarding frequency of PiP movement and displacement from a previous position. In aspects, the participant utilizes the user interface 86 (e.g., keyboard, remote control, etc.) to enter preferences into their user device 80, and the client component module 88 communicates the preference information to the content provider server 60, to be stored in the participant database 62.

In embodiments, the content provider server 60 gathers and stores participant data pertaining to the participant's user device (e.g., 80, 100) such as screen size, type of device, etc. In embodiments, the content provider server 60 gathers and stores participant data pertaining to the participant's likes, such as data indicating that the participant likes to watch a particular sport.

At step 301, the content provider server 60 streams content to the receiver 82 of the user device 80. By way of example, a video of a sporting event hosted by the content provider server 60 may be streaming to multiple user devices (including user device 80) simultaneously.

At step 302, participant data stored in the participant database 62 may be utilized by the content provider server 60 to group participants according to their common characteristics, such as the type of device they own and their viewing preferences. In aspects, the content provider server 60 analyzes the participant data in the participant database 62 and determines correlations (relationships) between participants. By way of example, participants who have the same type of user device (e.g., a particular brand and size of television) and who like the same sports would have a higher correlation than users who have the same type of user device, but who like different type of programming (e.g., sports vs. sitcoms). Steps 300 and 302 can be conducted on an ongoing basis, so that new participant data is continuously gathered and analyzed to determine up-to-date correlations and relationships between participants.

At step 303, the content provider server 60 defines an initial set of active users (confers active user status on a number of participants/participant devices to define a group of active users). In aspects, the active user module 64 initially assigns active user status to all the joiners of a stream. As used herein, the term joiner means the user of participant devices (e.g., recording devices) receiving the stream. Active users are conferred with certain privileges, as are discussed in more detail below. All participants may be defined by the active user module 64 as active users or passive users. A set of passive users is defined as all participants of the video stream or feed that are not part of the active user group. In aspects, the passive user group comprises participants who are passive viewers who choose not to adjust a PiP window, non-human recording streaming recording programs, or those human participants that make adjustments to the Pip window who are not part of the active user group.

In aspects, participants are added to the active user group by the content provider server 60 until a statistically significant group is formed, or the group has reached a predefined size. In embodiments, the size of the active user group is defined as a statistically significant number of participants compared to the total number of viewers. This level of significance, as denoted by a, is set arbitrarily by the content provider server 60 as a measure of desired accuracy in PiP placement. The higher the level of significance (e.g., 0.1%, 1%, 5%, etc.) the higher the chance that the average placement of the PiP window by the several participants of the active user group results in the optimal placement of the PiP window, to the detriment of complexity and increased computing requirements. At a constant α, if the universe of the stream viewers (participants) increases, so does the size of the active user group. Likewise, as a stream becomes less popular, the size of the active user group decreases.

At step 304, the cognitive image processor 72 of the autonomic module 68 determines initial PiP window coordinates. In embodiments, the cognitive image processor 72 utilizes historic feedback from all active users to calculate customized optimal PiP window coordinates. The manner in which the cognitive image processor 72 calculates optimal PiP window coordinate are discussed in more detail below.

At step 305, PiP window coordinates are sent to the user device 80. In embodiments, the content provider server 60 sends the initial PiP window coordinates to the client component module 88 of the user device 80, and the client component module 88 utilizes the coordinates to display a PiP window to a user through the display 84.

At step 306, updated PiP positioning data is received. In embodiments, the content provider server 60 receives updated PiP positioning data from the client component module 88 of the user device 80 in response to a user adjusting the position of a PiP window within their display 84.

At step 307, the content provider server 60 continuously monitors participant participation and adjusts the active group membership accordingly. In aspects, the active user module 64 monitors the PiP positioning data received at step 306 to determine the status of a participant. Further details regarding the manner in which the content provider server 60 monitors participant participation and adjusts the active user group are set forth in substeps 308-311.

Still referring to FIG. 3, in a substep 308, a value of a participant's contribution is computed. In aspects the active user module 64 computes the value of a participant's contribution based on the PiP position data received at step 306. Details regarding the manner in which the value of a participant's contribution may be calculated are discussed with respect to FIG. 5.

In substep 309, the value of a participant's standing is calculated. In embodiments, the active user device 64 computes the value of a participant's standing based on the PiP position data received at step 306. Details regarding the manner in which the value of a participant's standing may be calculated are discussed with respect to FIG. 6.

In substep 310, a participant's individually assigned delay value is determined. In aspects, the delay module 66 determines the amount of streaming video delay assigned to a particular participant based on the participant's standing determined at step 309. Details regarding the manner in which the delay value are discussed with respect to FIG. 7.

In substep 311, the participant's standing is updated. In aspects, the delay module 66 updates a participant's standing in the participant database 62 based on the determination at substep 310.

At step 312, the content provider server 60 sends the delay for a particular user determined at step 310 to a corresponding user device (e.g., 80, 100). In embodiments, the client component module (e.g., 88, 108) of the user device stores the delay and causes the streaming content of step 301 to be displayed in a delayed manner based on the delay.

At step 313, consensus position data is calculated and stored in a data store. In embodiments, the content provider server 60 determines consensus position data based on PiP position data received from a plurality of user devices (e.g., 80, 100) at step 305. Additional details regarding this step are discussed below.

At step 314, the autonomic module 68 retrieves participant data from the participant database 62 for appropriate participants (i.e., each participant whose PiP window is to be moved/adjusted by the PiP window system 55).

At step 315, the consensus position data from step 313 is processed and optimal PiP window coordinates are calculated based on the consensus position data and the participant data retrieved at step 314. In aspects, the cognitive image processor 72 of the autonomic module 68 calculates the optimal PiP window coordinates based on the consensus position data from step 313 and participant data retrieved from the participant database 62 at step 314 to obtain customized optimal PiP window coordinates.

The method then returns to step 305, wherein the PiP window coordinates sent to participants are the optimal coordinates of step 312. In embodiments, the content provider server 60 sends the optimal PiP window coordinates from step 313 to the client component module 88 of the user device 80, which causes the PiP window to be repositioned within the display 84. In aspects, each user device (e.g., 80, 100) receives different optimal PiP window coordinates in accordance with step 305.

User Type Identification

With reference to step 307 of FIG. 3, the active user module 64 may determine membership in the active user group based on the participant's continued PiP window repositioning activity. For example, frequent adjustments to the position of a PiP window by an active user cause the active user module 64 to increase the active user's status in the active user group. In aspects, frequent adjustments of a PiP window by a participant who has not been designated as an active user can result in a promotion of the participant by the active user module 64 from a passive user group into the active user group. Conversely, passive viewership degrades the participant's standing in the active user group by the active user module 64, even including demotion of the participant out of the active user group and into the passive user group. In embodiments, the content provider server 60 provides rewards to active users in the form of lower streaming video delays. Thus, the relative status of the active user may control the delay of the video stream to their user device (e.g., 80), with higher status being rewarded with lower delay values.

User Type Promotion

With reference to step 307 of FIG. 3, promotion of a given participant into the active user group may be embodied by a random selection method or a more complex algorithm. In embodiments, promotion of participants to the active user group is performed by the active user module 64 for every joiner to the stream that causes the size of the active user group to deviate from the stated a level by more than 0.0001 accuracy. In all cases, continued membership in the group is governed by the relative weight of the participant's contributions as compared to the contributions of all the other active users, plus the minimum size required maintaining statistical relevance, or meeting the desired a level.

In embodiments, a weight of contribution (e.g., PiP movement by participant) of a given active user degrades over time, so that members of the active user group are incentivized to continue to fine-tune the position of the PiP window. Continual fine tuning of the placement of the PiP window earns the active user increased stature in the active user group by the active user module 64, and prevents the active user from being demoted back to the passive user group.

Passive Users

With reference to step 312, of FIG. 3, in aspects, passive users receive the video image at their user device (e.g., 80) from the content provider server 60 after a programmed-in delay recognized by the delay module 66. This delay is used to allow for the PiP system 55 to compute the placement of the PiP window for any given time, and also allow the system 55 to cause advance movement of the PiP window. In this manner, the passive users, which may be either a significant majority or almost a totality of the entire viewership, are rewarded by having the PiP window move in advance of the action moving to that part of the screen, and thus avoid primary view occlusion.

Stream Delay

The delay of the stream offered to the general population (passive users) is in relation to the complexity of the stream being presented. A stream that by its nature elicits many adjustments by the active users (e.g., PiP window placement is adjusted frequently) will have a higher delay value. This is termed the base delay value. The delay that the stream has for an individual participant (active or passive) is an offset from the base delay value and has the effect of decreasing it. In this manner, the addition of the base delay and the offset produce the actual delay value experienced by any consumer. In aspects, this delay mechanism is introduced by the delay module 66 to facilitate the gradual advancement or delay of the video stream to match a participant's standing within, promotion into, or demotion out of, the active user group as recognized by the active user module 64.

With reference to step 307 of FIG. 3, in embodiments, the offset delay of a participant is thus calculated programmatically by the delay module 66 as the participant interacts with the PiP system 55, and produces movement of the PiP window that produces a position advantage. A participant that alters the position of the PiP in a negative manner is one that moves the PiP window to a placement that is incongruous with the majority of the active user's placements of the PiP window. Over time, such negative movements will compound and the participant's contribution will be degraded in value by the active user module 64, causing the participant to be demoted from the active users group. In embodiments, the offset of the participant who introduces such negative movements is varied in small increments to make the automatic adjustments of the system 55 unnoticeable by participants (viewers).

Proposed Overlay Positioning

Figure 4A:
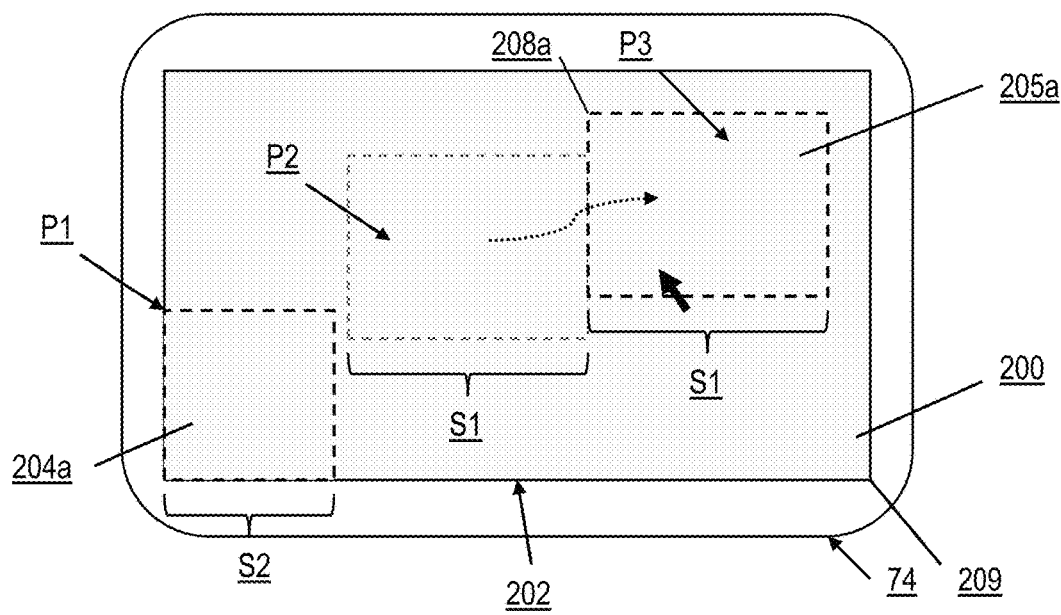
FIGS. 4A and 4B show PiP window re-positioning in accordance with aspects of the invention.

FIG. 4A depicts the display 84 of FIG. 2 displaying a current video frame 200 in a window 202. In embodiments, the content provider server 60 presents one or more proposed PiP windows to all active users as translucent overlays 204a, 205a on the current video frame 200, with proposed positions P1, P2 and sizes S1, S2. The translucent overlays 204a, 205a are taken from the position and size of the window 202 of the participant with the highest standing in the active user's group. Since the participant with the highest standing has the least delay time, the participant is the first to see the action (from the current video frame 200) on the display 74 and can propose where the one or more PiP windows (204a, 205a) should be positioned to minimize occlusion. For example, the highest ranking active user may utilize a mouse (represented at arrow 206) to move the PiP window 205a from an initial position P1 to a different position P3. As this choice is presented to the other members of the active user group, they can, by the preponderance of their positioning choices, support or detract from the initial window placement proposal. As the standing is continually computed, the active user with the most standing will tend to be the one to best represent the consensus of the active user community regarding placement of the one or more PiP windows, as well as being the most engaged active user.

Algorithms

Figure 4B:
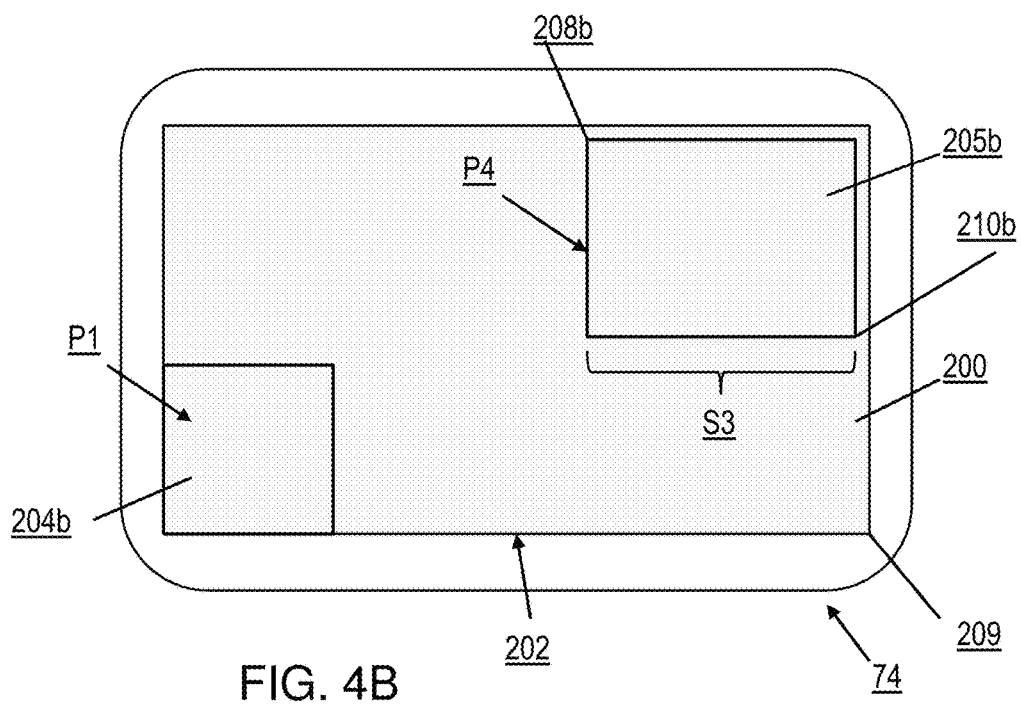

FIG. 4B depicts the display 74 of FIG. 4A after the automatic consensus placement of PiP windows 204b, 205b (consensus PiP windows) by the content provider server 60. The one or more PiP windows are repositioned according to a predetermined quantum of time. As used herein, the term "a quantum of time" refers to the amount of time between PiP window repositioning (e.g., every 5 seconds). The quantum of time is set by an administrator of the video feed to balance the responsiveness of the PiP system 55 with the detriment of increased computing resource requirements, and the required engagement by the active user community. In aspects, an administrator sets the quantum of time using the delay module 66 of the content provider server 60. If the quantum of time be set too low, the administrator risks increasing the workload of the active users enough that they decide to disengage from the PiP positioning activity.

Computing the position and size of each resulting consensus PiP windows (204b, 205b) for any given quanta of time in the video stream is based on the weighted averaging of the coordinates of the top-left corner 208a of the PiP window 205a and the bottom-right corner 209 in the several active user displays (e.g., 74, 94) for that given quantum of time. Specifically, the Cartesian (x,y) value is multiplied by the value of the active user's standing in the active user group. In this manner, the active user with the most standing has the most effect in the resulting PiP window's position and size. The coordinates $(x_i, y_i)$ are defined as the Cartesian coordinates for the top-left corner 208a of the proposed window of a participant i, and $S_i$ is defined as the standing of the participant i. The Cartesian coordinates of the top-left corner 208b of the new PiP window 205b is calculated with the formula:

$$\left( \frac{\sum x_i S_i}{\sum S_i}, \frac{\sum y_i S_i}{\sum S_i} \right)$$

The above formula is the average coordinates of all active users weighted by their corresponding standing within the universe of all active users. Similarly, the same formula is used to calculate the Cartesian coordinates for the bottom-right corner 210b of the new PiP window 205b.

User Contributions

With reference to step 313 of FIG. 3, in embodiments, computing the value of the contribution of a given active user to the placement of the consensus PiP window (e.g., 205b) is done by computing the amount of pixels in the active user's PiP window (e.g., 205a) that are present in the resulting computed position (e.g., P3) and size (e.g., S1), subtracted by the amount of pixels in the active user's PiP window (e.g., 205a) that are not present in the resulting computer position (e.g., P4) and size (e.g., S3). In this manner, the absolute value of the contribution of the given active user is directly proportional to the amount of overlap between the two PiP windows (e.g., 205a, 205b). Using this technique, the active user is prevented from confusing the system by making an oversized window, and is penalized by the system for doing so.

Figure 5:
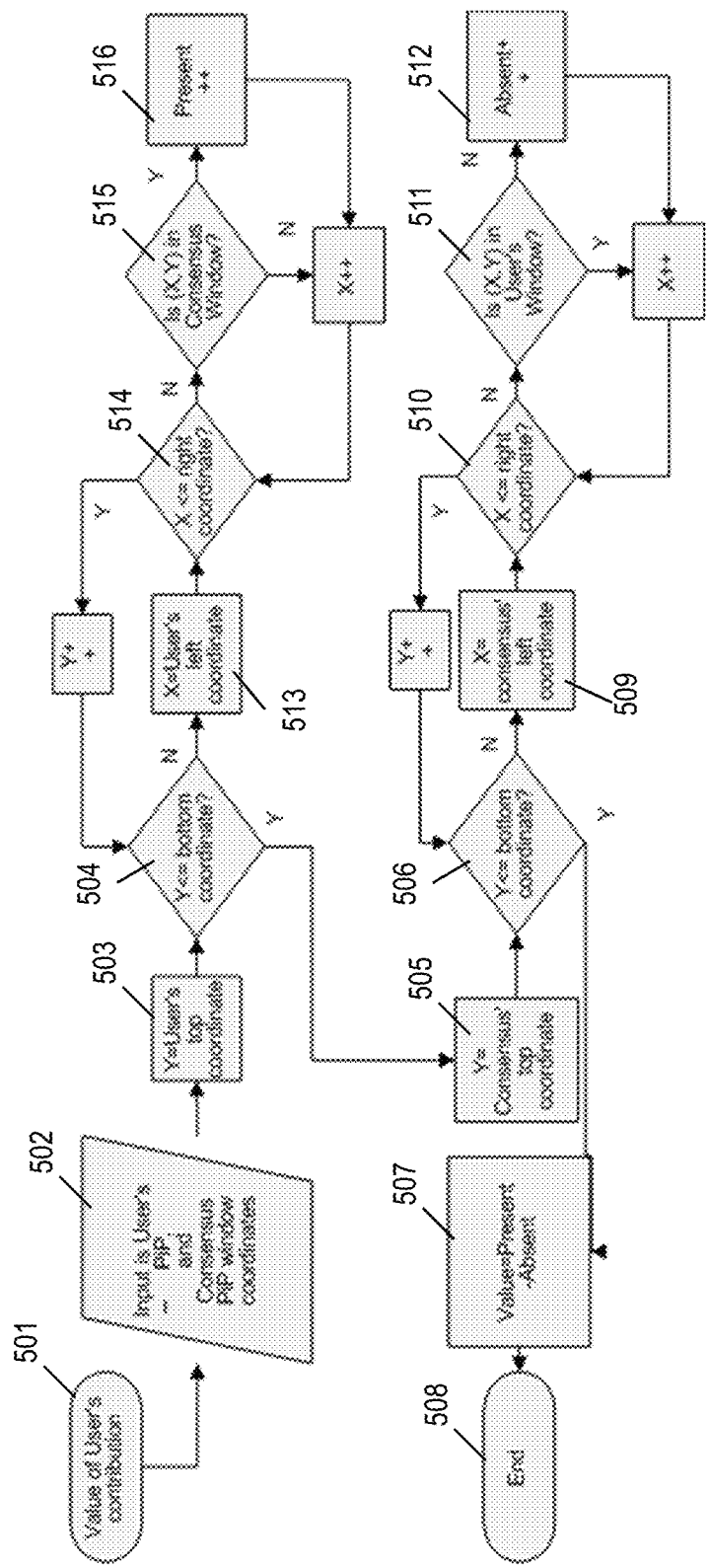
FIG. 5 depicts a flow chart of an algorithm for calculating the value of an active user's contribution, in accordance with embodiments of the invention.

FIG. 5 depicts a flow chart of an algorithm for calculating the value of an active user's contribution 501, in accordance with embodiments of the invention. As depicted in FIG. 5, the active user module 64 initially obtains a participant's PiP and consensus PiP window coordinates at 502, and assigns the parameter y to the user's top coordinate at 503. If y is less than or equal to the bottom coordinate at 504, then y is equals the consensus top coordinate at 505. If y is not less than or equal to the bottom coordinate at 506, then the value of y is equal to Present-Absent at 507, and the process ends at 508. If y is not less than or equal to the bottom coordinate at 506, then x equals the consensus left coordinate at 509, and it is determined if x is equal to the consensus left coordinate at 510. If the x is not less than or equal to the right coordinate at 510, then it is determined if (x,y) is in the user's window at 511. If (x,y) is in the user's window at 511, then the flow returns to step 510. If (x,y) is not in the user's window at 511, then it is determined to be absent at 512, and the flow returns to step 510. If x is less than or equal to the right coordinate at 510, then the flow returns to step 506.

At step 504, if y is not less than or equal to the bottom coordinate, then x equals the user's left coordinate at 513. If x is less than or equal to the right coordinate at 514, then the flow returns to 504. If x is not less than or equal to the right coordinate at 514, then it is determined if (x,y) is in the consensus window at 515. If (x,y) is in the consensus window at 515, then it is determined to be present at 516 and the flow returns to step 514. If (x,y) is not in the consensus window at 515, then the flow returns to step 514.

Active User Standing

Referring back to step 307 of FIG. 3, in embodiments, computing the standing of a given active user within the group of active users is performed by first subtracting a current standing value of an active user by a constant fraction (e.g., one-half, one-tenth, etc.) of the amount of pixels in the consensus PiP window (e.g., 205b). The higher the faction, the faster the active user's contributions are aged. Next, the value of the contribution for the current quantum is added. The resulting value is therefore incremented by the value of the current contribution (which could be positive or negative, but is never more than the number of the pixels in the consensus window), and reduced by the constant's amount. This results in a PiP system 55 with more opportunities for penalties than rewards.

Figure 6:
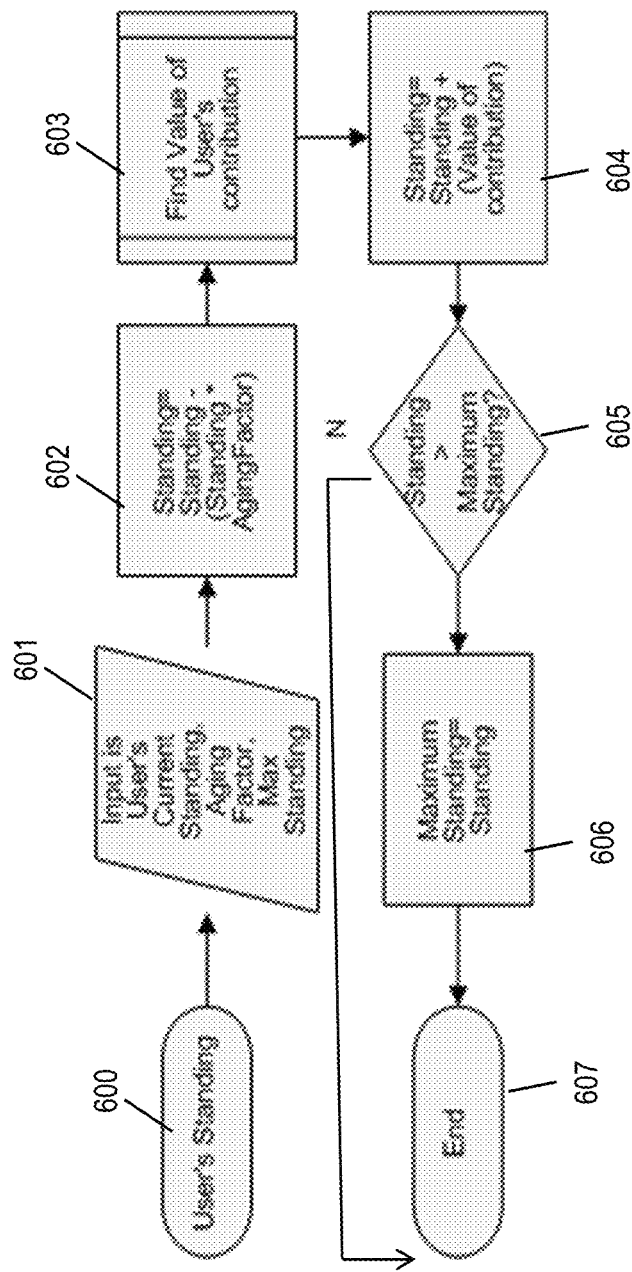
FIG. 6 depicts a flow chart of an algorithm for calculating a value for an active user's standing, in accordance with embodiments of the invention.

FIG. 6 depicts a flow chart of an algorithm for calculating a value for an active user's standing, in accordance with embodiments of the invention. As depicted in FIG. 6, a users standing at 600 is determined by the active user module 64 by first obtaining a user's current standing, aging factor and maximum standing at 601. At 602 the standing is calculated by: Standing=Standing−(Standing*Aging Factor). At 603 the value of a user's contribution is determined by the active user module 64. At 604, standing is calculated by: Standing=Standing+value of contribution. At 605, if the standing is greater than the maximum standing then the active use module 64 sets the Maximum Standing=the Standing at 606, and the process ends at 607. If the standing is not greater than the maximum standing then the process ends at 607.

Determining User Delay

Referring back to step 307 of FIG. 3, a given participant's delay (e.g., the amount of time that viewing of a stream of video by a user will be delayed with respect to receipt of the stream at a user device) may be calculated by first calculating an offset delay. The offset delay is calculated as the difference between the participant's standing and the maximum standing value. In this manner, the participant with the most standing has an offset of zero, effectively having a delay that matches the base delay. Participants with no standing (such as passive users or participants otherwise outside of the active user group) have the maximum offset delay time possible (i.e., the maximum delay). Participants in the active user group will therefore have a delay somewhat between the base delay and the maximum delay. The base delay is a value chosen by an administrator of a video feed that is sufficient to allow the content provider server 60 to perform all the computations required and meet the allowed delay time such as might be mandated by regulating authorities. The maximum delay is a value chosen by the administrator of the video feed that is the delay value given for regular participants (i.e., those not part of the active user group).

Figure 7:
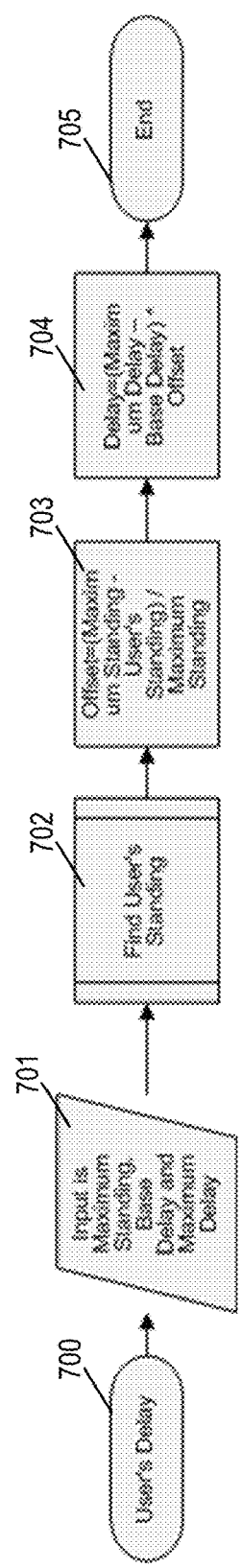
FIG. 7 depicts a flow chart of an algorithm for calculating a delay value for an active user in accordance with embodiments of the invention.

FIG. 7 depicts a flow chart of an algorithm for calculating a delay value for an active user in accordance with embodiments of the invention. As depicted in FIG. 7, a user delay 700 is determined by delay module 66 by obtaining an input of Maximum Standing, Base Delay and Maximum Delay at 701; finding a user's standing at 702 (e.g., obtain user standing calculated by the active user module 64 in accordance with the algorithm of FIG. 6); at 703 calculating an offset using: Offset=(Maximum Standing−User's Standing)/Maximum Standing; at 704 calculating delay using: Delay=(Maximum Delay−Base Delay)*Offset; and ending the algorithm at 705.

Autonomic Component

In embodiments, the autonomic module 68 is utilized to obtain optimal PiP coordinates for each participant in the PiP window system 55 based on consensus position data and participant data. In aspects, consensus position data is obtained in accordance with step 313 of FIG. 3, using the consensus window algorithm described above. In aspects, the autonomic module 68 analyses the consensus position data and the participant data to obtain a probability of a good PiP window for a given participant given a location (x,y coordinates) and a user group (participant group) of the participant. This probability is illustrated as:

P(Good PiP for user/location & user group)=P(location/good PiP*P(user group/Good PiP)*P(Good PiP)/P(location)*P(user group).

It is desirable to maximize the likelihood's of P(location|good PiP), P(location|good PiP) with the prior P(Good PiP). This means that the autonomic module 68 must determine if it has prior information about P(Good PiP) or the initial location of the PiP. In a first case (A), the autonomic module 68 does not have access to prior information, and the problem is treated as a uniform distribution of all PiPs for participants in a group, and is treated as a particle swarm optimization problem until the autonomic module 68 accumulates prior information. In a second case (B), the autonomic module 68 does have access to prior information, and uses the prior information to determine what a participant is interested in, recognizing objects in a video stream and placing the PiP location that best suits the prior information.

To obtain P(user group/good PiP) the autonomic module 68 uses:

$$\frac{\frac{1}{N}\sum_{i}^{N} S_i R_i C_i}{S_i R_i C_i}.$$

The following variables are utilized by the above-formula: N=the number of participants in a group; S sub i=a user's standing, where the sub i stands for a particular participant; R sub i=the correlation or how much the user's standing should be magnified by looking at how much participants' profiles (e.g., behaviors, preferences) match each other; and C sub i=the covariance between two users, which indicates in which direction the user's standing will move (positive or negative).

The P(user group|Good PiP) must be greater than or equal to 0 or less than or equal 1.

To obtain the length (l) and width (w) of a PiP window, the autonomic module 66 uses the formula:

$$\frac{\sum l_{ri} * w_{ri}}{l * w}; (l * w) \geq (l_{ri} * w_{ri}) \geq thresh.$$

The following variables are utilized by the above-formula: ($l_{ri}$) is the length of a region (r) for a participant (i), for a PiP; ($w_{ri}$) is the width of a region (r) for a participant (i); and thresh indicates a predetermined threshold value. All of the regions are joined together. The base l and w are variables that must be solved to know how to stretch the PiP given the x and y positions of the upper left hand corner.

It is desirable to maximize S, R, C, l, and w. When maximized, the variables are applied to the following formula:

$$\left( x_i + \frac{\sum_{i}^{N} x_i S_i R_i C_i}{S_i R_i C_i}, y_i + \frac{\sum_{i}^{N} y_i S_i R_i C_i}{S_i R_i C_i} \right).$$

In aspects, the autonomic module 68 uses the formula above to shift (x,y) coordinates of a PiP window for a particular participant from a consensus PiP position to a position optimized (customized) for the particular participant. In aspects, each user in the active group is correlated together by the active user module 64 through standing mean's over a window of time in accordance with step 302 of FIG. 3. A positive coefficient means that two participants' standing increase or decrease together. A negative coefficient means that the values travel in the opposite direction. In aspects, more weight is granted to the consensus window weight to a participant's group that is correlated. As a result, covariance determines if weight increases or decreases while correlation determines by how much.

One example of a covariance is as follows. Participant A likes a first sports team. Participant B likes a rival sports team. Both Participant A and Participant B are watching highlights of the rival sports team. The covariance will be −1 in this scenario, because Participant A and Participant B have opposite interests in the content.

One example of a correlation is as follows. Participant A likes sports and clothing. Participant B likes sports and food. Participant A and Participant B's interests will change over time, so the correlation between Participant A and Participant B is 0.6, which is measured on a scale of 0-1.

The manner in which the PiP window system 55 may function will now be described with reference to FIGS. 8 and 9.

Figure 8:
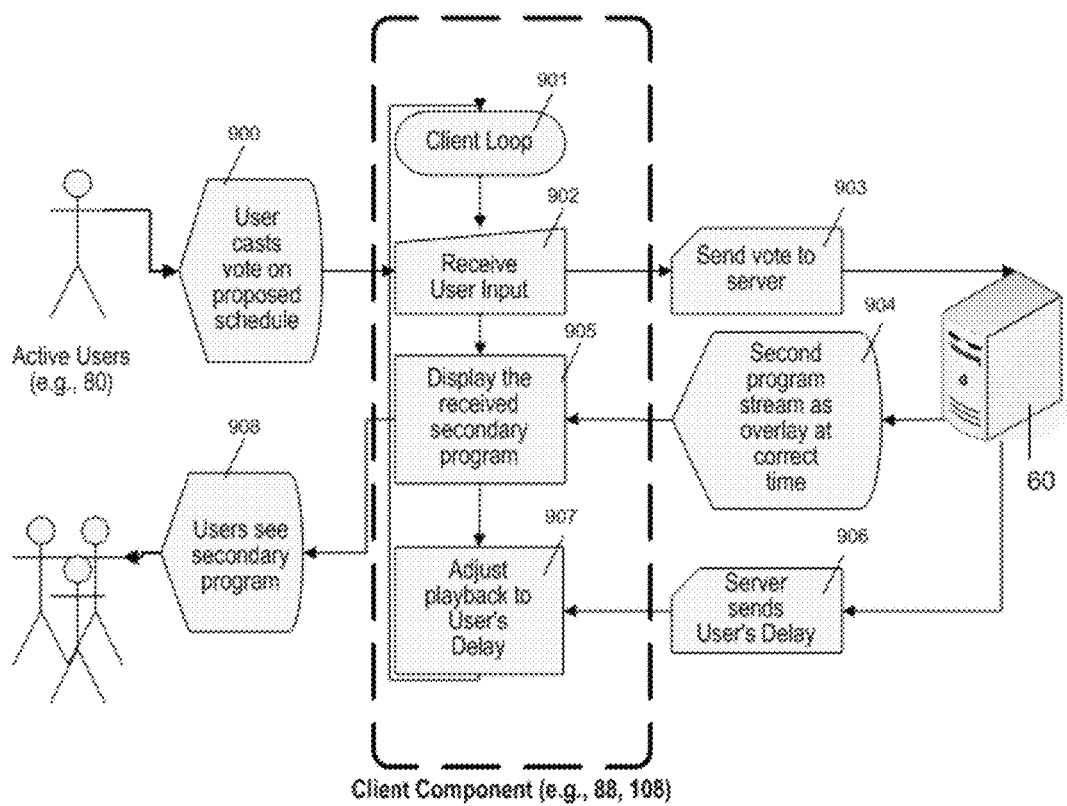
FIG. 8 is a diagram of client component functions and interactions according to embodiments of the invention.

FIG. 8 is a diagram of client component (e.g., 88, 108) functions and interactions according to embodiments of the invention. At 900 a participant utilizes a user interface (e.g., 86, 106) to cast a vote on a proposed schedule (i.e., moves a PiP window to a proposed location), and the vote is received by the client component (e.g., 88, 108) at 902 as user input. The client component (e.g., 88, 108) sends the vote to the content provider server 60 at 903. At 904 the content provider server 60 sends a second program stream (PiP window) as an overlay at a correct time. At 906, the content provider server 60 sends delay information calculated by the delay module 66 to the client component (e.g., 88, 108) in accordance with step 312 of FIG. 3. At 905, the client component (e.g., 88, 108) displays the received second program (PiP window), and at 907 the client component (e.g., 88, 108) adjusts the timing of the playback (display of the stream to the user) based on the delay information sent at 906. A client loop is represented at 901. At 908, a participant (user) sees the secondary program (PiP window) through a display (e.g., 84, 104).

Figure 9:
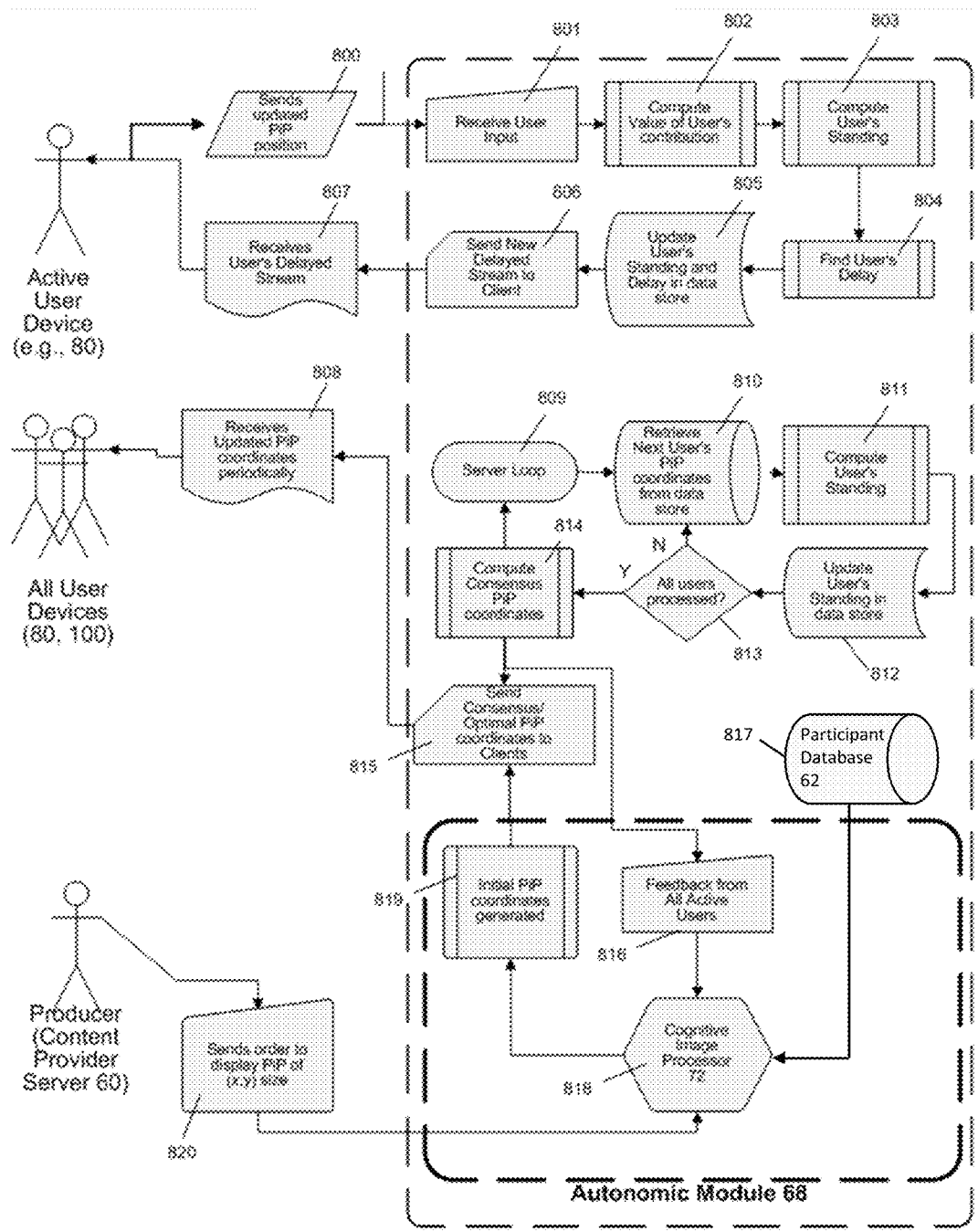
FIG. 9 is a diagram of server component functions and interactions according to embodiments of the invention.

FIG. 9 is a diagram of server component (e.g., 60) functions and interactions according to embodiments of the invention. At 800 an active user sends (e.g., through active user device 80) updated PiP position data to the content provider server 60. At 801, the content provider server 60 receives the user input, and at 802 the content provider server 60 computes a value of the participant's contribution.

At 803 the content provider server 60 computes the participant's standing. At 804 the content provider server 60 finds the participant's delay, and at 805 updates the participant's standing and delay in a data store (e.g., participant database 62). In embodiments, at 806, the content provider server 60 sends a new delayed stream of content to the user computer device (e.g., 80, 100), and the user computer device receives the delayed stream at 807.

At 808, all participants receive (e.g., through user devices 80, 100) updated PiP coordinates periodically, where the coordinates are customized for each individual participant by the autonomic module 68. A server loop is represented at 809. At 810 the content provider server 60 retrieves a participant's PiP coordinates from a data store and at 811 computes the participant's standing. At 812 the content provider server 60 updates a participant's standing in a data store (e.g., the participant database 62). It can be understood that steps 803 and 804 for active users may be the same as steps 811 and 812 for all users (including passive users). At step 813 the content provider server 60 determines if all users have been processed, and if they have, computes consensus PiP coordinates at 814. Conversely, if the content provider server 60 determines that less than all of the users have been processed, then 810-813 are repeated until all of the users have been processed. In embodiments, at step 815 consensus PiP coordinates are sent to participants periodically and the coordinates are received by participants as updated coordinates at 808. In embodiments, if consensus PiP coordinates are available, they are fed to the autonomic module 68 at 816, and are received by the cognitive image processor 72 at 818. In embodiments, participant data (e.g., correlation and covariance data) at 817 is also fed to the autonomic module 68 at 816. The cognitive image processor 72 determines optimal PiP coordinates for each participant in accordance with methods discussed above, and at 818 feeds the optimal PiP coordinates to the content provider server 60 at 815 to send to the participants at 808.

In embodiments, the initial PiP coordinates sent to a participant (i.e., the position of the first instance of the PiP window displayed to a user) are optimal PiP coordinates calculated by the autonomic module 68 based on participant data from the participant database 62. In embodiments, updated PiP coordinates sent to participants after the initial PiP coordinates are consensus PiP coordinates.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that provides streaming content. In return, the service provider can receive payment from the customer(s) under a subscription and/or fee agreement and/or the service provider can receive payment from the sale of advertising content to one or more third parties.

In still another embodiment, the invention provides a computer-implemented method for autonomic overlaying of objects within a hosted data stream. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for autonomic positioning of overlays within streaming data, comprising:
  providing, by a computer device, a hosted data stream containing a first display object to a plurality of participants through respective remote participant devices on a network;
  providing, by the computer device, a hosted second display object to the plurality of participants through the respective remote participant devices, wherein the second display object is contained within an overlay that is positioned atop the first display object at a first position;
  calculating, by the computing device, consensus coordinates for the second display object based on suggested position data received from the respective remote participant devices;
  calculating, by the computing device, customized coordinates for the second display object for each of the respective remote participant devices based on the consensus coordinates and participant data, wherein the customized coordinates are based on a shifting of the consensus coordinates based on covariance and correlation data of the participant data; and
  sending, by the computing device, the customized coordinates to each of the respective remote participant devices.

2. The method of claim 1, further comprising:
  monitoring, by the computing device, participation of the subset of participants; and
  adjusting, by the computing device, a standing of each of the subset of participants.

3. The method of claim 1, further comprising sending, by the computing device, a delay to the respective remote participant devices, wherein the delay indicates a delay time for displaying the first display object and second display object.

4. The method of claim 3, wherein the delay time is based on a standing of a respective participant.

5. The method of claim 1, wherein the consensus coordinates are determined based on a weighted average.

6. The method of claim 5, further comprising receiving, by the computing device, the suggested position data for the second display object from a subset of the respective remote participant devices.

7. The method of claim 1, further comprising gathering, by the computing device, participant data pertaining to the respective remote participation devices, the participant data including screen size and type of device.

8. A computer program product for autonomic positioning of overlays within streaming data, the computer program product comprising a computer readable storage medium having program instructions embodied therewith, the program instructions executable by a computing device to cause the computing device to:

provide a hosted data stream containing a first display object to a plurality of participants through respective remote participant devices via a network connection;

obtain and process participant data from the respective remote participant devices to determine correlations and covariance between the participants;

provide a hosted second display object to the plurality of participants through the respective remote participant devices, wherein the second display object is contained within an overlay that is positioned atop the first display object at a first position;

receive suggested position data for the second display object from a subset of the respective remote participant devices;

calculate consensus coordinates for the second display object based on the suggested position data;

calculate optimal coordinates for the second display object for each of the respective remote participant devices based on the consensus coordinates and the correlations and covariance between the participants; and send the optimal coordinates to each of the respective remote participant devices, wherein at least two different optimal coordinates are sent to respective remote participant devices.

9. The computer program product of claim 8, wherein the program instructions further cause the computing device to:

monitor the amount of participation within a given time for each participant of the participants; and adjust a standing of each of the participants based on the respective amount of participation.

10. The computer program product of claim 8, wherein the program instructions further cause the computing device to send a delay to the respective remote participant devices, wherein the delay indicates a delay time for displaying the first display object and second display object.

11. The computer program product of claim 8, wherein the delay time is based on a standing of a respective participant.

12. The computer program product of claim 8, wherein the optimal coordinates are based on a shifting of the consensus coordinates based on the covariance and correlations between the participants.

13. The computer program product of claim 8, wherein the consensus coordinates are determined based on a weighted average.

14. The computer program product of claim 8, wherein the program instructions further cause the computing device to gather participant data pertaining to the respective remote participation devices, the participant data including screen size and type of device.

15. A system for autonomic positioning of overlays within streaming data, comprising:

a CPU, a computer readable memory and a computer readable storage medium associated with a computing device;

program instructions to provide a hosted data stream containing a first display object to a plurality of participants through respective remote participant devices via a network connection;

program instructions to provide a hosted second display object to the plurality of participants through the respective remote participant devices, wherein the second display object is contained within an overlay that is positioned atop the first display object at a first position;

program instructions to receive suggested position data for the second display object from a subset of the respective remote participant devices;

program instructions to calculate consensus coordinates for the second display object based on the suggested position data;

program instructions to retrieve correlation and covariance data for the participants from a data store;

program instructions to calculate optimal coordinates for the second display object for each of the respective remote participant devices based on the consensus coordinates and the correlations and covariance data; and program instructions to send the optimal coordinates to each of the respective remote participant devices, wherein the optimal coordinates are customized for each of the participants;

wherein the program instructions are stored on the computer readable storage medium for execution by the CPU via the computer readable memory.

16. The system of claim 15, further comprising:

program instructions to monitor the amount of participation within a given time for each participant of the participants; and program instructions to adjust a standing of each of the participants based on the respective amount of participation.

17. The system of claim 15, further comprising program instructions to send a delay to the respective remote participant devices, wherein the delay indicates a delay time for displaying the first display object and second display object.

18. The system of claim 15, wherein the optimal coordinates are based on a shifting of the consensus coordinates based on the covariance and correlations between the participants.

19. The system of claim 15, wherein the consensus coordinates are determined based on a weighted average.

* * * * *